(12) United States Patent
Li et al.

(10) Patent No.: US 11,435,135 B2
(45) Date of Patent: Sep. 6, 2022

(54) REFRIGERATOR APPLIANCE GUIDED FOOD STORAGE

(71) Applicant: Haier US Appliance Solutions, Inc., Wilmington, DE (US)

(72) Inventors: Jianwu Li, Louisville, KY (US); Jason Andrew May, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 98 days.

(21) Appl. No.: 16/885,522

(22) Filed: May 28, 2020

(65) Prior Publication Data
US 2021/0372694 A1    Dec. 2, 2021

(51) Int. Cl.
| | |
|---|---|
| *G06F 3/048* | (2013.01) |
| *F25D 29/00* | (2006.01) |
| *F25D 17/04* | (2006.01) |
| *G06F 3/0481* | (2022.01) |
| *G06F 3/16* | (2006.01) |
| *G06T 11/00* | (2006.01) |

(52) U.S. Cl.
CPC ........... *F25D 29/00* (2013.01); *F25D 17/042* (2013.01); *G06F 3/0481* (2013.01); *G06F 3/167* (2013.01); *G06T 11/00* (2013.01); *F25D 2400/361* (2013.01); *F25D 2700/06* (2013.01); *G06T 2200/24* (2013.01)

(58) Field of Classification Search
CPC ...... F25D 29/00; F25D 17/042; G06F 3/0481; G06F 3/167; G06T 11/00
See application file for complete search history.

(56) References Cited

U.S. PATENT DOCUMENTS

| | | | |
|---|---|---|---|
| 7,673,464 B2 | 3/2010 | Bodin | |
| 9,195,960 B2 | 11/2015 | Kim | |
| 9,791,936 B1* | 10/2017 | Kovach | .................... G09G 5/12 |
| 10,228,187 B2* | 3/2019 | Kim | ........................ F25D 27/00 |
| 11,022,329 B1* | 6/2021 | Hurlebaus | ............. F24F 3/1405 |
| 11,221,145 B2* | 1/2022 | Bhogal | .................... F24C 3/124 |
| 2006/0130498 A1* | 6/2006 | Joshi | ..................... F25D 17/042 |
| | | | 62/127 |
| 2017/0205138 A1 | 7/2017 | Ho | |
| 2017/0219279 A1* | 8/2017 | Chae | ........................ F25D 11/00 |
| 2019/0186816 A1* | 6/2019 | Hwang | .................. G06Q 10/00 |
| 2019/0186817 A1* | 6/2019 | Hwang | .............. G06Q 10/0832 |
| 2019/0237183 A1* | 8/2019 | Won | ........................ G06Q 10/10 |
| 2020/0097776 A1* | 3/2020 | Kim | ..................... G06K 9/6267 |

FOREIGN PATENT DOCUMENTS

CN           206583182 U    10/2017

* cited by examiner

*Primary Examiner* — David Phantana-angkool
(74) *Attorney, Agent, or Firm* — Dority & Manning, P.A.

(57) ABSTRACT

A method of operating a refrigerator appliance is provided. The refrigerator appliance includes a controller and a plurality of food storage compartments. The method includes identifying a food item, such as in response to a user input. The method also includes retrieving optimal or preferred storage conditions for the identified food item. The method may include modifying the conditions of a selected food storage compartment and/or providing instructions to modify the conditions of the selected food storage compartment.

15 Claims, 8 Drawing Sheets

REFRIGERATOR APPLIANCE GUIDED FOOD STORAGE

FIELD OF THE INVENTION

The present subject matter relates generally to refrigerator appliances, and more particularly to systems and methods for providing guidance for storing food items in a refrigerator appliance.

BACKGROUND OF THE INVENTION

Refrigerator appliances generally include a cabinet that defines a chilled chamber. A wide variety of food items may be stored within the chilled chamber. The low temperature of the chilled chamber relative to ambient atmosphere assists with increasing a shelf life of the food items stored within the chilled chamber.

However, various different food items may have differing storage requirements. For example, the optimal temperature, humidity and/or atmospheric composition for one food item may differ from that of another food item, e.g., a meat or dairy product may last longer at a temperature that would be too cold for some fruits or vegetables.

Accordingly, a refrigerator with features for identifying optimal storage conditions for food items and guiding a user to store the items in a portion of the refrigerator appliance which provides or approximates the optimal storage conditions would be useful.

BRIEF DESCRIPTION OF THE INVENTION

Aspects and advantages of the invention will be set forth in part in the following description, or may be apparent from the description, or may be learned through practice of the invention.

In a first exemplary embodiment, a method of operating refrigerator appliance is provided. The refrigerator appliance includes a controller and a plurality of food storage compartments having independently controlled temperature and humidity. The method includes receiving an input with a user interface device. The input includes an identity of a food item. The method also includes retrieving optimal temperature and humidity for storage of the food item based on the received identity of the food item. The method further includes modifying the temperature and humidity of a selected one of the plurality of food storage compartments based on the retrieved optimal temperature and humidity for storage of the food item.

In a second exemplary embodiment, a method of operating refrigerator appliance is provided. The refrigerator appliance includes a controller and a plurality of food storage compartments having independently controlled environmental conditions. The method includes identifying a food item in response to a user input received at a user interface device. The method also includes retrieving preferred environmental conditions for storage of the identified food item. The method further includes providing instructions on an interface of the user interface. The instructions include an indication of a selected food storage compartment of the plurality of food storage compartments and instructions to modify the environmental conditions of the selected food storage compartment to the preferred environmental conditions for storage of the identified food item.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
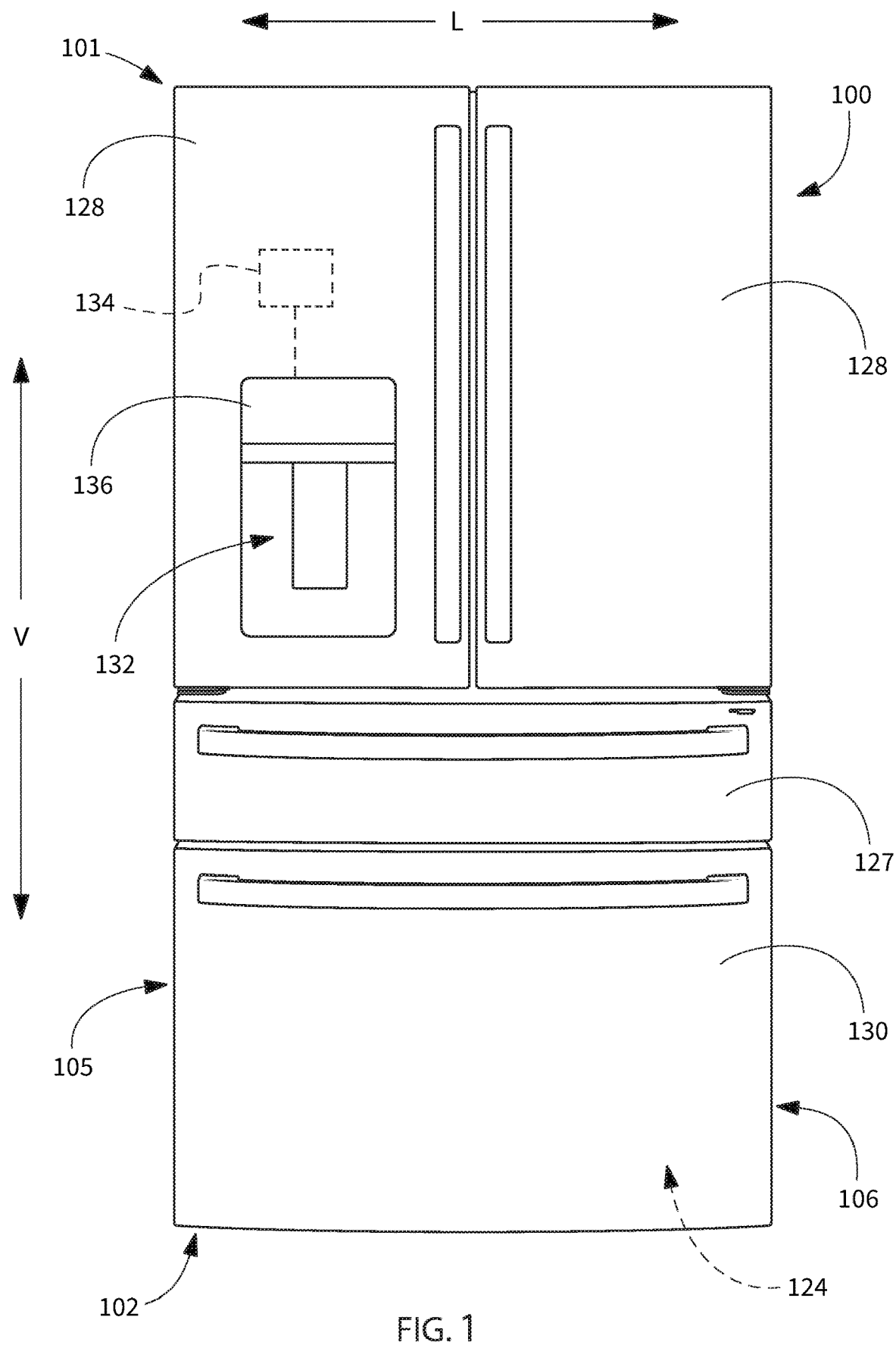
FIG. 1 provides a front view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
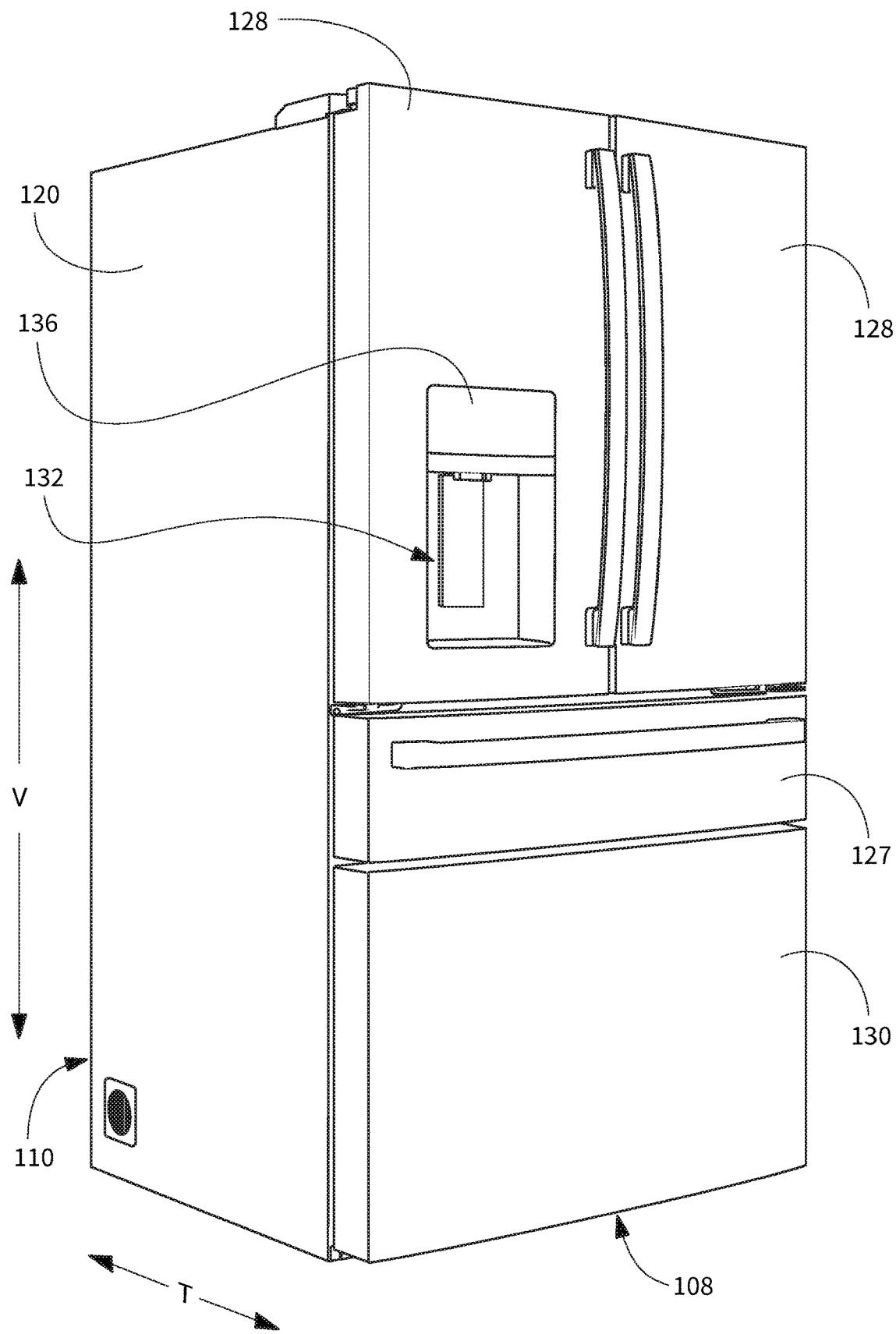
FIG. 2 provides a perspective view of the refrigerator appliance of FIG. 1.
Figure 3:
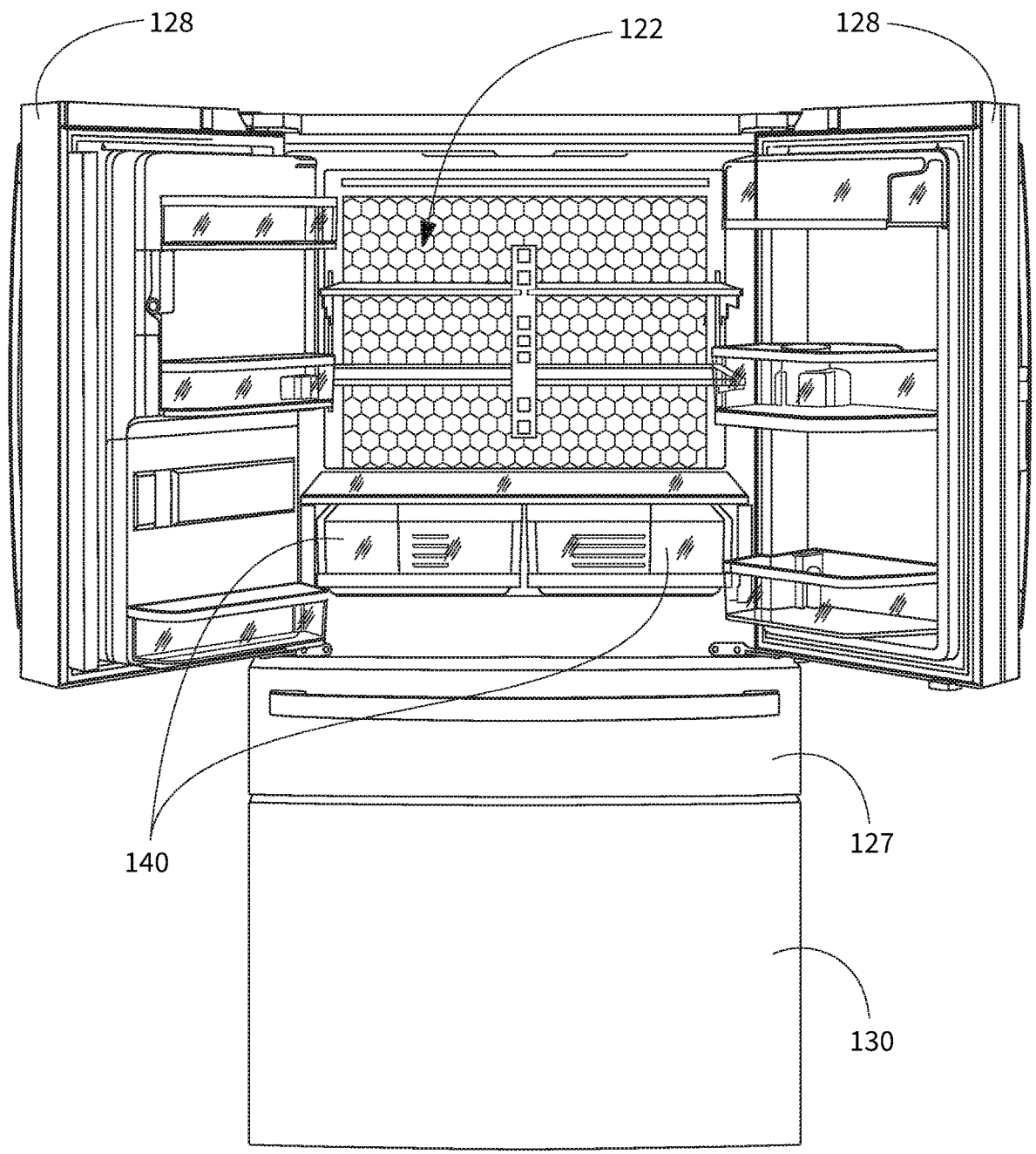
FIG. 3 provides a front view of the refrigerator appliance of FIG. 1 with doors in an open position.
Figure 4:
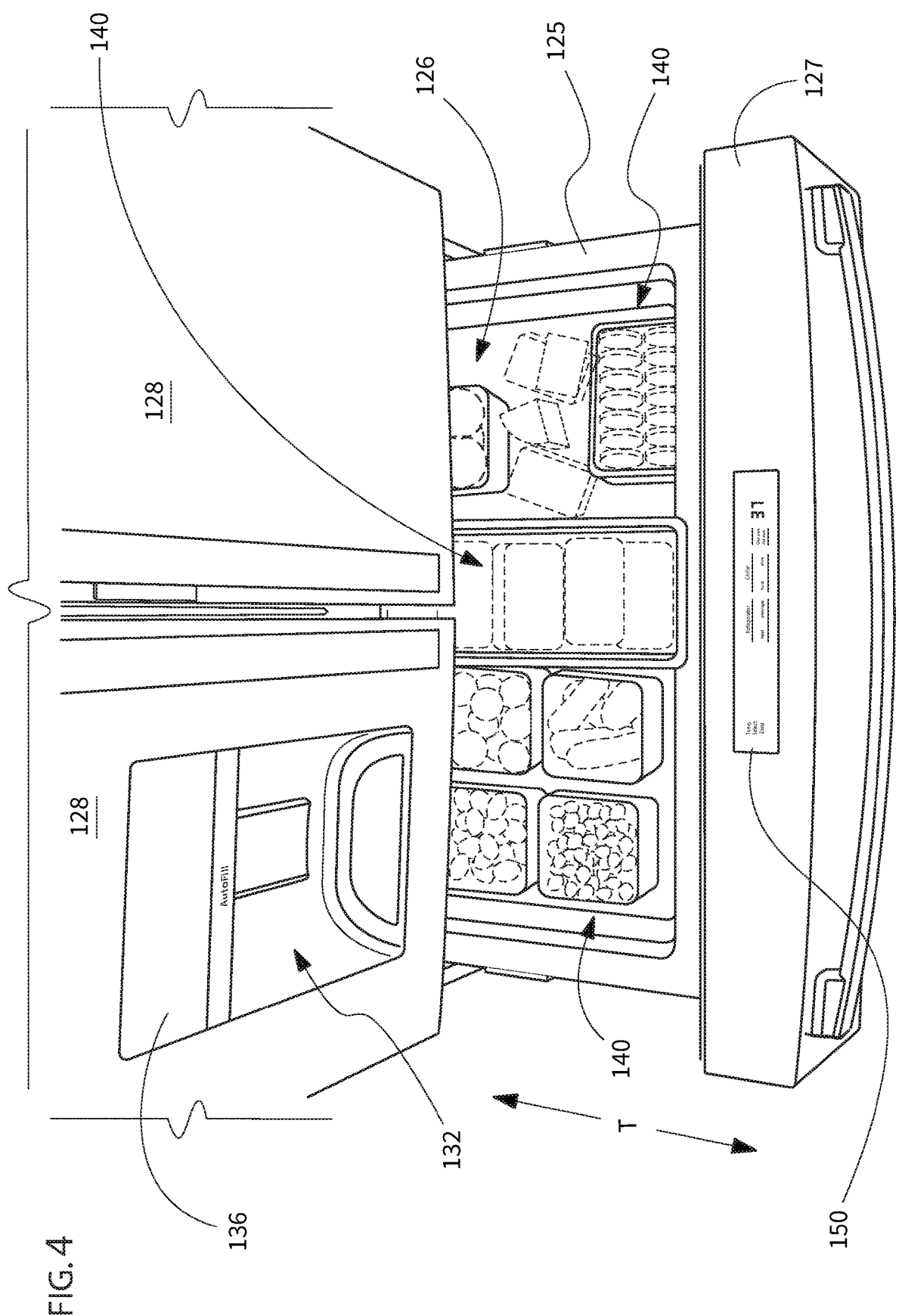
FIG. 4 provides a perspective view of a portion of the refrigerator appliance of FIG. 1 with another door in an open position.

FIG. 1 is a front view of an exemplary embodiment of a refrigerator appliance 100. FIG. 2 is a perspective view of the refrigerator appliance 100. FIG. 3 is a front view of the refrigerator appliance 100 with fresh food doors 128 thereof in an open position. FIG. 4 provides a perspective view of a portion of the refrigerator appliance 100 with an auxiliary drawer 125 thereof in an open position. Refrigerator appliance 100 extends between a top 101 and a bottom 102 along a vertical direction V. Refrigerator appliance 100 also extends between a first side 105 and a second side 106 along a lateral direction L. As shown in FIG. 2, a transverse direction T may additionally be defined perpendicular to the vertical and lateral directions V, L. Refrigerator appliance 100 extends along the transverse direction T between a front portion 108 and a back portion 110.

Refrigerator appliance 100 includes a cabinet or housing 120 defining an upper fresh food chamber 122 (FIG. 3) and a lower freezer chamber or frozen food storage chamber 124 arranged below the fresh food chamber 122 along the vertical direction V. An auxiliary food storage chamber 126 (FIG. 4) is positioned between the fresh food storage chamber 122 and the frozen food storage chamber 124, e.g., along the vertical direction V. Because the frozen food storage chamber 124 is positioned below the fresh food storage chamber 122, refrigerator appliance 100 is generally referred to as a bottom mount refrigerator. In the exemplary embodiment, housing 120 also defines a mechanical compartment (not shown) for receipt of a sealed cooling system (not shown). Using the teachings disclosed herein, one of skill in the art will understand that the present technology can be used with other types of refrigerators (e.g., side-by-sides) or a freezer appliance as well. Consequently, the description set forth herein is for illustrative purposes only and is not intended to limit the technology in any aspect.

Refrigerator doors 128 are each rotatably hinged to an edge of housing 120 for accessing fresh food chamber 122. It should be noted that while two doors 128 in a "French door" configuration are illustrated, any suitable arrangement of doors utilizing one, two or more doors is within the scope and spirit of the present disclosure. A freezer door 130 is arranged below refrigerator doors 128 for accessing freezer chamber 124. In the exemplary embodiment, freezer door 130 is coupled to a freezer drawer (not shown) slidably mounted within freezer chamber 124. An auxiliary door 127 is coupled to an auxiliary drawer 125 (FIG. 4) which is slidably mounted within the auxiliary chamber 126 (FIG. 4).

Operation of the refrigerator appliance 100 can be regulated by a controller 134 that is operatively coupled to a user interface panel 136. Interface 136 provides selections for user manipulation of the operation of refrigerator appliance 100 to modify environmental conditions therein, such as temperature selections, etc. In some embodiments, user interface panel 136 may be proximate a dispenser assembly 132. Panel 136 provides selections for user manipulation of the operation of refrigerator appliance 100 such as e.g., temperature selections, including those discussed herein, etc. In response to user manipulation of the user interface panel 136, the controller 134 operates various components of the refrigerator appliance 100. Operation of the refrigerator appliance 100 can be regulated by the controller 134, e.g., controller 134 may regulate operation of various components of the refrigerator appliance 100 in response to programming and/or user manipulation of the user interface panel 136.

The controller 134 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. It should be noted that controllers 134 as disclosed herein are capable of and may be operable to perform any methods and associated method steps as disclosed herein.

The controller 134 may be positioned in a variety of locations throughout refrigerator appliance 100. In the illustrated embodiment, the controller 134 may be located within the door 128. In such an embodiment, input/output ("I/O") signals may be routed between the controller and various operational components of refrigerator appliance 100. In one embodiment, the user interface panel 136 may represent a general purpose I/O ("GPIO") device or functional block. In one embodiment, the user interface 136 may include input components, such as one or more of a variety of electrical, mechanical or electro-mechanical input devices including rotary dials, push buttons, and touch pads. The user interface 136 may include a display component, such as a digital or analog display device designed to provide operational feedback to a user. For example, the user interface 136 may include a touchscreen providing both input and display functionality. The user interface 136 may be in communication with the controller via one or more signal lines or shared communication busses.

Using the teachings disclosed herein, one of skill in the art will understand that the present subject matter can be used with other types of refrigerators such as a refrigerator/freezer combination, side-by-side, bottom mount, compact, and any other style or model of refrigerator appliance. Accordingly, other configurations of refrigerator appliance 100 could be provided, it being understood that the configurations shown in the accompanying FIGS. and the description set forth herein are by way of example for illustrative purposes only.

As illustrated in FIG. 4, the auxiliary food storage compartment 126 may be controlled by a dedicated user interface 150. The dedicated user interface 150 may, for example, be provided on the auxiliary drawer 127. The dedicated user interface 150 may be in operative communication with the controller 134. The dedicated user interface 150 may provide options for controlling or adjusting the operation of one or more compartments 140 defined within the auxiliary food storage chamber 126.

As may be seen in FIGS. 3 and 4, a plurality of food storage compartments 140 are disposed within the fresh food storage chamber 122 and auxiliary food storage chamber 126. In particular, the food storage compartments 140 may be independently controlled, e.g., may be provided with independent environmental controls which permit the environmental conditions within one compartment 140 to differ from those of another compartment 140. At least some of the independently controlled food storage compartments 140 may be sealed and provided with, e.g., separate insulation, separate ducting or conduits with associated dampers, valves, etc. for ventilation and/or directing cooling air or other gases into the compartments to modify environmental conditions within each compartment 140 independent of the fresh food chamber 122, auxiliary food storage chamber 126, and/or other compartments 140 within the same respective chamber 122 or 126. The present disclosure is not limited to any specific means or methods for achieving independent environmental control for each food storage compartment.

The independently controlled environmental conditions of each food storage compartment may include but are not limited to temperature, humidity, and/or atmospheric composition. The refrigerator appliance 100 may include one or more environmental control systems, such as a sealed cooling system for controlling temperature, a humidity control device, and one or more atmospheric composition control devices.

Sealed cooling systems are generally understood by those of ordinary skill in the art, and are recognized as including a compressor and heat exchangers, such as a condenser and one or more evaporators, with a refrigerant sealed therein. Possible humidity control devices may include a mist pump or a membrane micro-humidifier cell to add or extract moisture as required. Atmospheric composition within one or more sub-chambers may be controlled or modified by devices such as an ozone generator, which may be a Coplanar Discharge Ozone Generator (CDOG), for adding ozone, a UV light, and/or a vent, filter, or adsorbent for removing ethylene. Ozonation or UV light may be useful in some environmental conditions, e.g., when humidity is increased, for suppressing mold growth. Ethylene is produced by some fruits as they ripen and high atmospheric concentrations of ethylene may accelerate the ripening of the fruit, as such, removing or reducing ethylene from food storage compartments containing fruits may prolong the shelf life of the stored fruit. The foregoing example environmental control systems are exemplary only and without limitation. Such environmental control systems are generally understood by those of ordinary skill in the art and, as such, are not illustrated or described in further detail herein.

Each food storage compartment 140 may be provided with independent ducts and associated dampers for selectively providing the necessary amount of cooled air to each food storage compartments 140 to achieve the preferred temperature for storage of various food items, as well as to provide preferred ventilation. A mist pump and/or ozone generator or other equipment for modifying the environmental conditions of one or more of the food storage compartments 140 may be in fluid communication with each food storage compartment or a selected subgroup of the compartments. For example, in an embodiment including three independently controlled food storage compartments 140, all three compartments may each have a separate fluid conduit connected thereto for providing, e.g., mist from a mist pump to control the humidity in each compartments. It is also possible in other embodiments including three independently controlled food storage compartments to provide humidity control in only one or two of the compartments, while the remaining food storage compartments may have, e.g., independently controlled temperature. In various other embodiments, certain features, e.g., humidity control or ethylene level control, may be provided in all or less than all of the food storage compartments. Additional example embodiments may include two independently controlled food storage compartments 140, or four independently controlled food storage compartments 140, or more than four independently controlled food storage compartments 140.

As described in more detail below, embodiments of the present disclosure may include identifying a food item. The controller 134 may operate the environmental control system in order to modify the temperature, humidity, and atmospheric composition of one or more of the plurality of food storage compartments 140 to approximate the preferred temperature, humidity, and atmospheric composition for storage of an identified food item.

Figure 5:
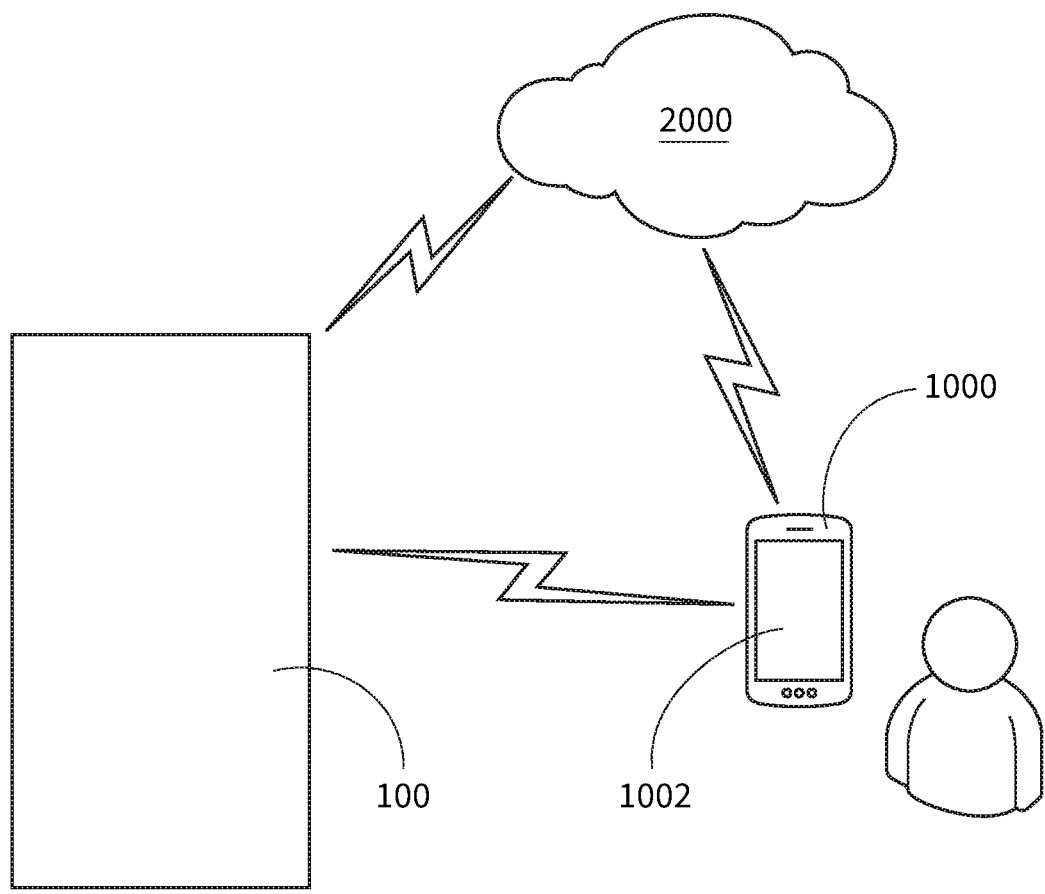
FIG. 5 provides a schematic illustration of an exemplary refrigerator appliance in communication with a remote user interface device according to one or more embodiments of the present invention.

For example, the food item may be identified by a remote user interface device 1000, e.g., such as the remote user interface device 1000 illustrated in FIG. 5. FIG. 5 schematically illustrates the refrigerator appliance 100 communicating with a remote user interface device 1000. Also shown (but not numbered) in FIG. 5 is a user such as may interact with the remote user interface device 1000, e.g., via a user interface 1002 of the remote user interface such as a touchscreen in the illustrated embodiment. For example, the remote user interface device 1000 may be a hand-held device, such as a cell phone or smart phone or any similar device, in operative communication with the controller 134 via a wireless connection. As shown in FIG. 5, the refrigerator appliance 100, and in particular, controller 134 thereof, may be configured to communicate with a separate device external to the appliance, such as a communications device or other remote user interface device 1000. The remote user interface device 1000 may be a laptop computer, smartphone, tablet, personal computer, wearable device, smart home system, and/or various other suitable devices. The refrigerator appliance 100 may include a network communication module, e.g., a wireless communication module, for communicating with the remote user interface device 1000. In various embodiments, a network communication module may include a network interface such that the controller 134 of the refrigerator appliance 100 can connect to and communicate over one or more networks with one or more network nodes. A network communication module may also include one or more transmitting, receiving, or transceiving components for transmitting/receiving communications with other devices communicatively coupled with refrigerator appliance 100. The network communication module may be in communication with, e.g., coupled or connected to, the controller 134 to transmit signals to and receive signals from the controller 134.

As schematically illustrated in FIG. 5, the refrigerator appliance 100 may be configured to communicate with the remote user interface device 1000 either directly or through a network 2000. Thus, in various embodiments, the refrigerator appliance 100 and the remote user interface 1000 may be configured to communicate wirelessly with each other and/or with the network 2000. The network 2000 may be or include various possible communication connections and interfaces, e.g., such as Zigbee, BLUETOOTH®, WI-FI®, or any other suitable communication connection. The remote user interface device 1000 may include a memory for storing and retrieving programming instructions. For example, the remote user interface device 1000 may be a smartphone operable to store and run applications, also known as "apps," and may include a remote user interface provided as a smartphone app.

Figure 6:
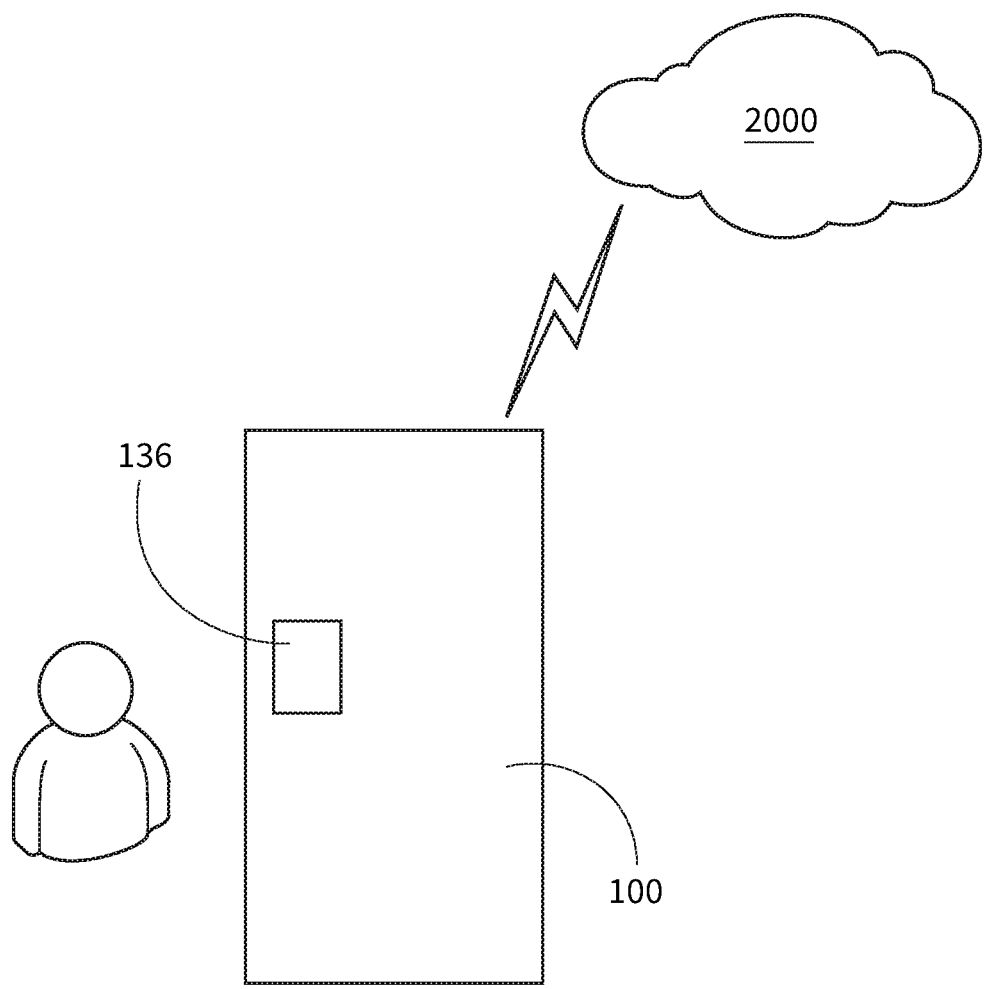
FIG. 6 provides a schematic illustration of an exemplary refrigerator appliance including a local user interface device according to one or more additional embodiments of the present invention.

As another example, the food item may be identified by a local user interface device, such as the user interface panel 136 of the refrigerator appliance 100, e.g., as illustrated in FIG. 6. As mentioned above, the user interface panel 136 of the refrigerator appliance 100 may be or include a touchscreen for providing both input functionality and display functionality. In such embodiments, the display of the touchscreen user interface panel 136 may serve as an interface of the user interface device and may be used to, e.g., provide instructions and/or visual indications to a user (shown but not numbered in FIG. 6). In such embodiments, the controller 134 may communication with the local user interface device 136 as well as or instead of the remote user interface device 1000 (FIG. 5). For example, the controller 134 may communicate directly and/or via a hardwired connection with the local user interface device 136. Additionally, it is to be understood that embodiments including the local user interface device 136 as described herein may also include a network communication module, as described above in the context of the remote user interface device 1000. Similarly, in such embodiments, the refrigerator appliance 100 may be configured to wirelessly communicate with the network 2000, e.g., via WI-FI®, etc., as described above.

Figure 7:
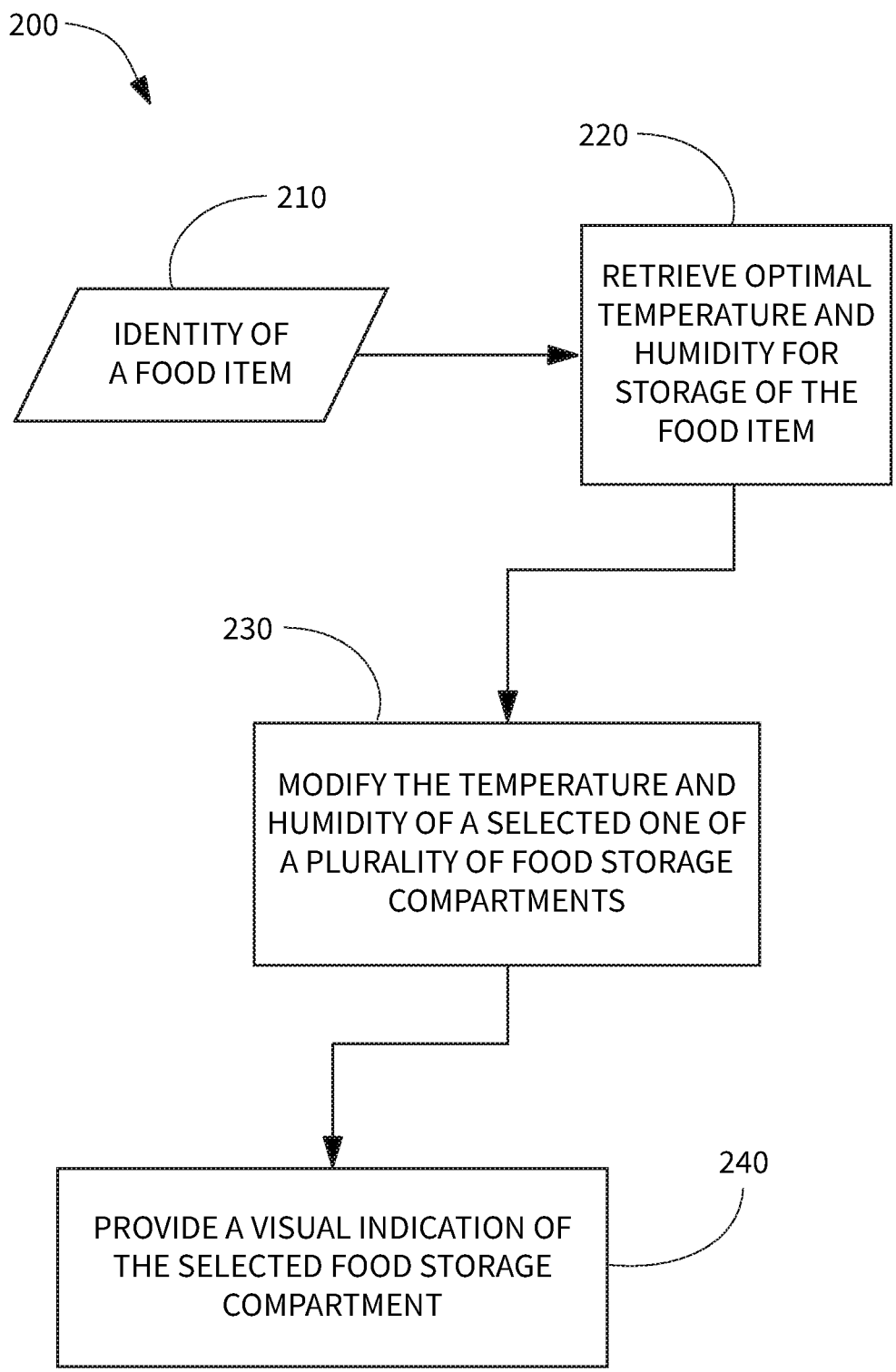
FIG. 7 provides a flow diagram of an exemplary method for operating a refrigerator appliance according to one or more embodiments of the present subject matter.
Figure 8:
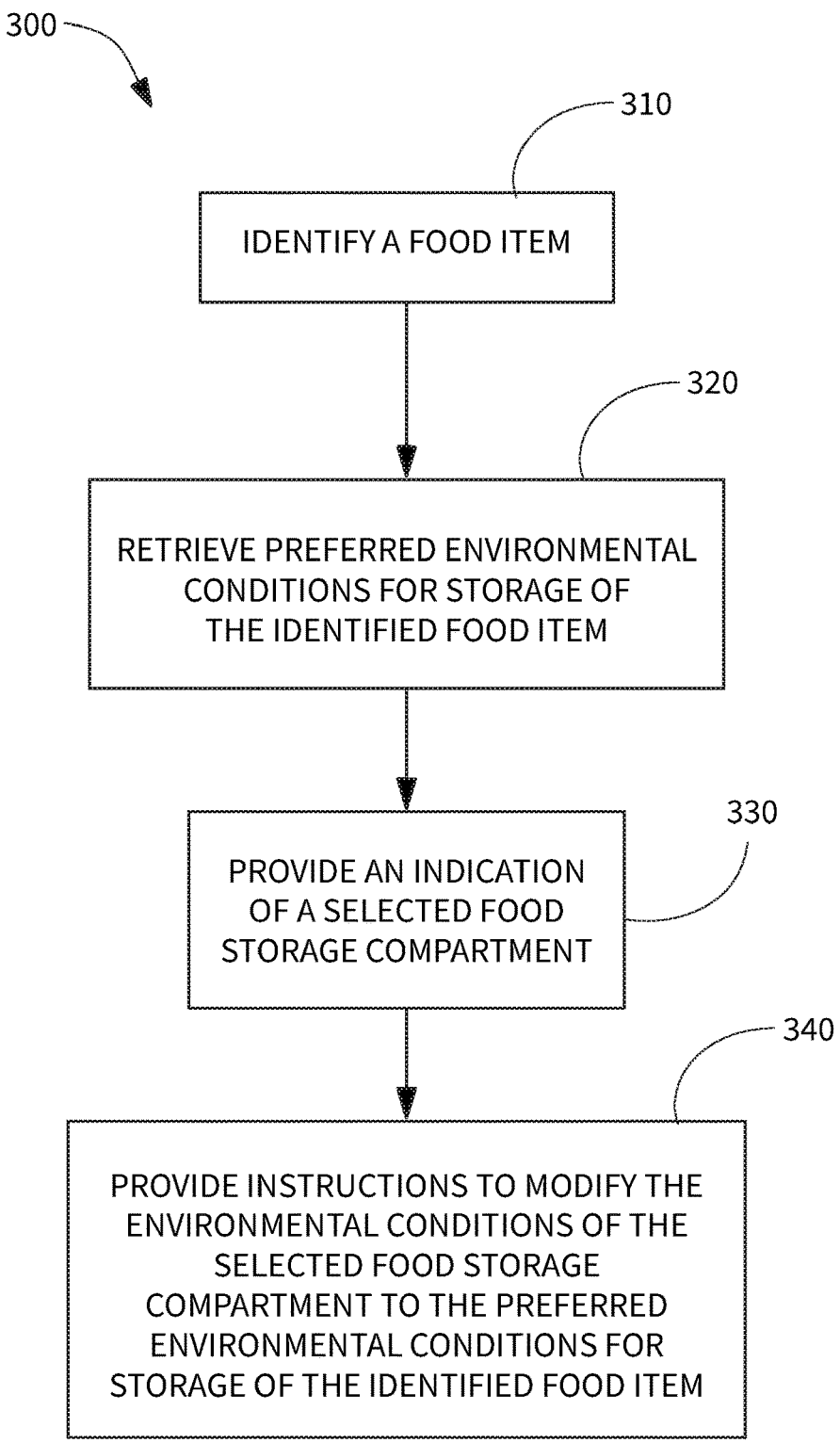
FIG. 8 provides a flow diagram of another exemplary method for operating a refrigerator appliance according to one or more embodiments of the present subject matter.

Turning now to FIG. 7, embodiments of the present disclosure may include a method 200 of operating a refrigerator appliance, such as the exemplary refrigerator appliance 100 described above. For example, the refrigerator appliance may include a controller and a plurality of independently controlled food storage compartments, e.g., a plurality of food storage compartments having independently controlled temperature and humidity, as described above. In some embodiments, the method 200 may include receiving an input 210. The input 210 may be received with a remote user interface device 1000 and/or a local user interface device 136. The input 210 may include an identity of a food item.

In some embodiments, the input 210 may be a manual entry via the user interface device 136 or 1000. In some embodiments, identification of the food item may be accomplished with a camera of the user interface device 136 or 1000. For example, the user interface device 136 or 1000 may be configured, such as by running a bar code scanner app, for scanning UPC codes and/or QR codes. Thus, in such embodiments, the input 210 may be an image or a scan of, e.g., a one-dimensional or two-dimensional bar code associated with the food item with food identification information encoded therein. In some embodiments, the remote user interface device 1000 and/or the controller 134 of the refrigerator appliance 100 may be configured for image-based processing, e.g., to identify a food item. In such embodiments, the input 210 may be an image of the food item, e.g., a photograph of the food item taken with a camera of the user interface device 136 or 1000. For example, the controller 134 or the remote user interface device 1000 may be configured to identify the food item by comparison of the image (an embodiment of the input 210) to a stored image of a known or previously-identified food item. In additional embodiments, the input 210 may include a voice command. For example, the user interface device 136 or 1000 may include a microphone and may include voice-recognition software in order to receive and respond to the voice command.

As illustrated for example in FIG. 6, the method 200 may further include a step 220 of retrieving preferred or optimal temperature and humidity for storage of the food item based on the received identity of the food item. For example, the retrieving step 220 may be performed by the remote user interface device 1000 and/or by the controller 134 of the refrigerator appliance 100. The optimal temperature and humidity may be retrieved from a memory of the remote user interface device 1000 or controller 134 and/or from a remote database, e.g., which the controller 134 or remote user interface device 1000 connects to via the network 2000.

In some embodiments, retrieving the optimal temperature and humidity based on the received identity of the food item may include looking up the food item in a lookup table, which may be stored either locally or remotely (e.g., accessible via network 2000). Further, in some embodiments, the step 220 of retrieving optimal temperature and humidity for storage of the food item may further include retrieving optimal temperature and humidity for storage of the food item from a remote database when the food item is not included in the lookup table, e.g., via the internet. The method 200 may then include adding the food item and the retrieved optimal temperature and humidity to the lookup table after retrieving the optimal temperature and humidity for storage of the food item from the remote database, e.g., via the internet.

In some embodiments, the method 200 may include a step 230 of modifying the temperature and humidity of a selected one of the plurality of food storage compartments based on the retrieved optimal temperature and humidity for storage of the food item. For example, the method 200 may include modifying the environmental conditions of the selected one of the plurality of food storage compartments to be or approximate the retrieved preferred environmental conditions for storage of the identified food item. In some embodiments, modifying the temperature and humidity of the selected food storage compartment may include sending a command from the user interface device 136 or 1000 to the controller 134 of the refrigerator appliance 100. In such embodiments, the controller 134 may modify the temperature and humidity of the selected food storage compartment to the retrieved optimal temperature and humidity for storage of the food item in response to the command from the user interface device 136 or 1000.

In various embodiments, the preferred environmental conditions for storage of the identified food item may include at least one of temperature, humidity, and/or atmospheric composition. In such embodiments, the method 200 may further include retrieving an optimal atmospheric composition for storage of the food item based on the received identity of the food item, and modifying the atmospheric composition of the selected one of the plurality of food storage compartment based on the retrieved optimal atmospheric composition for storage of the food item. For example, in embodiments where the input is received by the local user interface device 136 (FIG. 6), the retrieving step may be performed by the controller 134. As another example, in embodiments where the input is received by the remote user interface device 1000, the remote user interface device 100 may perform the step of retrieving the preferred environmental condition(s) for storage of the identified food item.

As illustrated in FIG. 7, in some embodiments, the method 200 may also include a step 240 of providing a visual indication on an interface of the user interface device of the selected food storage compartment. The interface of the user interface device may be or include a touchscreen or other display component of the user interface panel 136, e.g., in embodiments where the user interface device is the local user interface device 136. The interface of the user interface device may be or include a touchscreen of the remote user interface device 1000 in other embodiments.

For example, the visual indication on the interface of the user interface device may include a stored image of the refrigerator appliance and a graphical overlay on the stored image of the refrigerator appliance, where the graphical overlay includes an indication of the selected food storage compartments, such as an arrow, an outline of the selected food storage compartment, highlighting the selected food storage compartment, or other visual indication of the selected food storage compartment. As another example, the visual indication on the interface of the user interface device may include an augmented reality overlay on a live image of the refrigerator appliance.

Referring now to FIG. 7, an exemplary method 300 of operating a refrigerator appliance 100 according to at least one additional embodiment is illustrated. The refrigerator appliance 100 may include a controller, a plurality of food storage compartments, at least one of the food storage compartments having independently controlled environmental conditions, and, in some embodiments at least one sensor may be associated with each food storage compartment having independently controlled environmental conditions. The independently controlled environmental conditions may include temperature, humidity, and/or atmospheric composition.

In some embodiments, method 300 may include the step 310 of identifying a food item in response to a user input received at a user interface device, such as the local user interface device 136 and/or the remote user interface device 1000. The food item may be identified in response to one or more of a text input, a voice command, or an image of the food item.

The exemplary method 300 may further include a step 320 of retrieving food storage data related to the identified food item. In some embodiments, the food storage data may include preferred environmental conditions for storage of the identified food item. The food storage data may be retrieved from a memory onboard the user interface device 136 or 1000 in some embodiments, while other embodiments may include retrieving food storage data related to the identified food item from a remote location, such as via the network 2000. The food storage data that is retrieved may be or include preferred environmental conditions for storage of the identified food item.

In some embodiments, retrieving preferred environmental conditions for storage of the food item may include looking up the identified food item in a lookup table. Further, at least some embodiments where the food item is looked up in the table may also include retrieving preferred environmental conditions for storage of the food item from a remote database when the food item is not included in the lookup table. In such embodiments, and the food item and the retrieved preferred environmental conditions may be added to the lookup table after retrieving the preferred environmental conditions for storage of the food item from the remote database.

The preferred environmental conditions may include one or more of a preferred humidity level, a preferred temperature, or a preferred atmospheric composition. For example, the preferred atmospheric composition may be or include ozone content and/or ethylene content.

As illustrated in FIG. 7, the method 300 may further include providing instructions, e.g., on an interface of the user interface 136 or 1000. In some embodiments, the instructions may include, at step 330, providing an indication of a selected food storage compartment of the plurality of food storage compartments, such as a visual indication, e.g., a graphic overlay on a stored image or live image of the refrigerator appliance 100. The instruction may further include, e.g., as noted at step 340 in FIG. 7, instructions to modify the environmental conditions of the selected food storage compartment to the preferred environmental conditions for storage of the identified food item. For example, the instructions at step 340 may also include a graphical overlay, such as an arrow pointing to the applicable controls (such as user interface panel 136 or dedicated user interface 150 of the auxiliary food storage chamber 126, as described above) and text including one or more settings to input via the indicated control(s), e.g., a temperature setting in degrees, typically Celsius or Fahrenheit, or a humidity level, generally expressed as a percentage, among other possible example settings.

Those of ordinary skill in the art will recognize that the foregoing methods and embodiments of the present disclosure provide numerous advantages and improvements in user interfaces. For example, the present disclosure provides a streamlined and efficient interface for guiding a user to select an optimal or preferred food storage compartment out of a plurality of food storage compartments in a refrigerator appliance. As another example, the present disclosure provides a more intuitive and easier to understand interface for instructing and guiding a user in adjusting one or more settings of an environmental control system of a refrigerator appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a refrigerator appliance, the refrigerator appliance comprising a controller and a plurality of food storage compartments having independently controlled temperature and humidity, the method comprising:
   receiving an input with a user interface device, the input comprising an identity of a food item;
   looking up the food item in a lookup table;
   determining that the food item is not included in the lookup table;
   retrieving optimal temperature and humidity for storage of the food item based on the received identity of the food item from a remote database;
   adding the food item and the retrieved optimal temperature and humidity to the lookup table after retrieving the optimal temperature and humidity for storage of the food item from the remote database; and
   modifying at least one of the temperature and the humidity of a selected one of the plurality of food storage compartments based on the retrieved optimal temperature and humidity for storage of the food item.

2. The method of claim 1, further comprising providing a visual indication on an interface of the user interface device of the selected food storage compartment.

3. The method of claim 2, wherein the visual indication on the interface of the user interface device comprises a stored image of the refrigerator appliance and a graphical overlay on the stored image of the refrigerator appliance, the graphical overlay comprising an indication of the selected food storage compartments.

4. The method of claim 2, wherein the visual indication on the interface of the user interface device comprises an augmented reality overlay on a live image of the refrigerator appliance.

5. The method of claim 1, wherein the user interface device is a local user interface device.

6. The method of claim 1, wherein the user interface device is a remote user interface device.

7. The method of claim 1, further comprising retrieving an optimal atmospheric composition for storage of the food item based on the received identity of the food item, and modifying the atmospheric composition of the selected one of the plurality of food storage compartment based on the retrieved optimal atmospheric composition for storage of the food item.

8. The method of claim 1, wherein the input received by the user interface device comprises a voice command.

9. The method of claim 1, wherein the input received by the user interface device comprises an image of the food item.

10. A method of operating a refrigerator appliance, the refrigerator appliance comprising a controller and a plurality of food storage compartments having independently controlled environmental conditions, the method comprising:
    identifying a food item in response to a user input received at a user interface device;
    looking up the identified food item in a lookup table;

retrieving preferred environmental conditions for storage of the identified food item from a remote database;

adding the food item and the retrieved preferred environmental conditions to the lookup table after retrieving the preferred environmental conditions for storage of the food item from the remote database; and providing instructions on an interface of the user interface device, the instructions including an indication of a selected food storage compartment of the plurality of food storage compartments and instructions to modify the environmental conditions of the selected food storage compartment to the preferred environmental conditions for storage of the identified food item.

11. The method of claim 10, wherein the preferred environmental conditions comprise at least one of a preferred humidity level, a preferred temperature, and a preferred atmospheric composition.

12. The method of claim 10, further comprising providing a visual indication of the selected food storage compartment on the interface of the user interface device, wherein the indication of the selected food storage compartment on the interface of the user interface device comprises a stored image of the refrigerator appliance and a graphical overlay on the stored image of the refrigerator appliance, the graphical overlay comprising an indication of the selected food storage compartments.

13. The method of claim 10, further comprising providing a visual indication of the selected food storage compartment on the interface of the user interface device, wherein the indication of the selected food storage compartment on the interface of the user interface device comprises an augmented reality overlay on a live image of the refrigerator appliance.

14. The method of claim 10, wherein the user interface device is a local user interface device.

15. The method of claim 10, wherein the user interface device is a remote user interface device.

* * * * *